United States Patent
Wang et al.

(10) Patent No.: US 9,624,420 B1
(45) Date of Patent: Apr. 18, 2017

(54) FOAM STABILIZER COMPOSITION, FOAMED CEMENT SLURRY AND ADDITIVE COMPOSITION THEREOF

(71) Applicant: China University of Petroleum (East China), Qingdao, Shandong (CN)

(72) Inventors: Chengwen Wang, Shandong (CN); Ruihe Wang, Shandong (CN); Baojiang Sun, Shandong (CN); Weidong Zhou, Shandong (CN)

(73) Assignee: China Univeristy of Petroleum (East China), Shandong (CN)

( * ) Notice: Subject to any disclaimer, the term of this patent is extended or adjusted under 35 U.S.C. 154(b) by 0 days.

(21) Appl. No.: 15/296,908

(22) Filed: Oct. 18, 2016

(30) Foreign Application Priority Data

Sep. 12, 2016 (CN) .......................... 2016 1 0818002

(51) Int. Cl.

| | | |
|---|---|---|
| C04B 7/00 | (2006.01) | |
| C04B 16/00 | (2006.01) | |
| C04B 24/00 | (2006.01) | |
| C09K 8/487 | (2006.01) | |
| C04B 24/12 | (2006.01) | |
| C04B 38/10 | (2006.01) | |
| C04B 24/26 | (2006.01) | |
| C04B 24/16 | (2006.01) | |
| C04B 24/18 | (2006.01) | |
| B01F 17/00 | (2006.01) | |
| C04B 103/48 | (2006.01) | |
| C04B 103/40 | (2006.01) | |
| C04B 103/20 | (2006.01) | |
| C04B 103/46 | (2006.01) | |

(52) U.S. Cl.
CPC .......... *C09K 8/487* (2013.01); *B01F 17/0021* (2013.01); *B01F 17/0042* (2013.01); *B01F 17/0092* (2013.01); *C04B 24/124* (2013.01); *C04B 24/166* (2013.01); *C04B 24/18* (2013.01); *C04B 24/2623* (2013.01); *C04B 38/10* (2013.01); *C04B 2103/20* (2013.01); *C04B 2103/408* (2013.01); *C04B 2103/46* (2013.01); *C04B 2103/48* (2013.01)

(58) Field of Classification Search
CPC ....... C09K 8/487; C04B 24/124; C04B 38/10; C04B 24/2623; C04B 24/166; C04B 24/18; C04B 2103/48; C04B 2103/408; C04B 2103/20; C04B 2103/46; B01F 17/0092; B01F 17/0042; B01F 17/0021
USPC ...... 523/130; 106/808, 810, 287.3; 252/8.05
See application file for complete search history.

(56) References Cited

U.S. PATENT DOCUMENTS

| | | | |
|---|---|---|---|
| 6,858,566 B1 * | 2/2005 | Reddy ..................... | C04B 38/02 106/672 |
| 7,067,000 B1 * | 6/2006 | Szymanski ............. | C04B 28/02 106/696 |
| 2006/0016602 A1 * | 1/2006 | Chatterji ................. | C04B 24/16 166/293 |
| 2008/0277116 A1 * | 11/2008 | Roddy .................. | C04B 20/008 166/292 |
| 2012/0000397 A1 * | 1/2012 | Koyanagi ............... | C04B 28/02 106/808 |
| 2013/0319673 A1 * | 12/2013 | Pewitt .................... | C04B 24/10 166/294 |

\* cited by examiner

*Primary Examiner* — David Karst
(74) *Attorney, Agent, or Firm* — Calfee, Halter & Griswold LLP

(57) ABSTRACT

The present invention relates to the field of oil and natural gas well cementation engineering, in particular to a foam stabilizer composition, foamed cement slurry and an additive composition thereof. The foam stabilizer composition comprises C6-C20 alkyl amido alkyl amine oxide, C6-C20 alkyl amido alkyl betaine, and triterpenoid saponin compound. The foam stabilizer composition provided in the present invention is helpful for forming foamed cement slurry that has high foam stability, and the foam stabilizer composition can work with other active components in the foamed slurry additive composition provided in the present invention to enable the foamed cement slurry that contains the additive composition to obtain low density, high foam stability, low permeability, and high compressive strength, which is especially applicable to well cementing operation in an oil and natural gas exploration and development process.

20 Claims, No Drawings

US 9,624,420 B1

FOAM STABILIZER COMPOSITION, FOAMED CEMENT SLURRY AND ADDITIVE COMPOSITION THEREOF

CROSS REFERENCE TO RELATED APPLICATIONS

This application claims priority to Chinese Application No. 201610818002.0, filed on Sep. 12, 2016, entitled "Foam Stabilizer Composition, Foamed Cement Slurry and Additive Composition thereof", the content of which is incorporated herein by reference as if recited in its entirety.

FIELD OF THE INVENTION

The present invention relates to the field of oil and natural gas well cementation engineering, in particular to a foam stabilizer composition, foamed cement slurry, an additive composition for the foamed cement slurry.

BACKGROUND OF THE INVENTION

In the oil and natural gas exploration and development process, low-pressure and leaky formations are often encountered. During well cementing operation in a low-pressure and leaky formation, a problem of cement slurry leakage and inadequate return height is often encountered. To prevent leakage during well cementation, foamed cement slurry is often used for well cementation.

Foamed cement slurry refers to a low-density three-phase viscous fluid containing stable and evenly distributed foams, prepared by charging a gas into cement slurry and improving foam stability by means of a surfactant or macromolecular substance. Foamed cement slurry has advantages such as low density, low permeability, low fluid loss, low heat conductivity, high compressibility, and high strength, etc., can effectively solve the problem of leakage during well cementation in low-pressure and leaky formations, and is used more and more widely.

There are mainly two methods for preparing foamed cement in the field: one method is mechanical aeration method, and the other method is chemical aeration method. The mechanical aeration method requires more devices, involves a complex process, and requires elaborate design and automatic computer control; therefore, it is difficult to apply that method in the field, and the cost is high. In contrast, the chemical aeration method requires less devices and involves a less complex process flow; specifically, a chemical substance that can produce a gas (mainly a chemical substance that produces nitrogen gas) is directly added into the oil well cement material or water; hence, that method has advantages such as simple operation and low cost, and is the future developing trend of foamed cement.

There are many substances that can produce nitrogen gas through chemical reaction. For example, sodium nitrite and ammonium chloride can react to produce nitrogen gas, while releasing a great deal of heat. That reaction is applicable to heat-generating hydro-fracturing fluids and thermal chemical oil recovery, etc. However, sodium nitrite and ammonium chloride can react to produce nitrogen gas only in an acidic environment, but cement slurry is an alkaline medium environment, in which sodium nitrite and ammonium chloride can't produce nitrogen gas.

In addition, azo substances, such as azobisformamide, azodiisobutyronitrile, dinitrosopentamethylene tetraamine, 4,4'-dioxylbisbenzenesulfonyl hydrazide, p-toluenesulfon hydrazide, 5-phenyl tetrazole, and trihydrazinotriazine, etc., can produce nitrogen gas when they are decomposed; however, those substances can be decomposed and produce nitrogen gas when the temperature reaches their decomposition temperature under a heating condition. As a result, they are not suitable use in the surface preparation environment and under the conditions for preparing foamed cement slurry; in addition, those substances are flammable and explosive, involving some potential safety hazards.

Furthermore, when the foamed system is generated, the energy of the system will increase as the total area of the system increases. Therefore, such a system belongs to a thermodynamically unstable system and tends to evolve towards the direction of decreased energy and reduced total area, i.e., the foams tend to burst. To prepare a stable foamed cement slurry system, often a foam stabilizer has to be added into the cement slurry. Most foam stabilizers are surfactant substances, which can form a directional alignment on the surface of solution (usually water), and thereby remarkably decreases the surface tension (or interfacial tension) of the solvent, modifies the mechanical strength and viscosity of the foam film, and improves the stability of the foamed cement slurry. At present, the foam stabilizers for foamed cement slurry are mainly sulfonate anionic surfactants, such as alkylbenzene sulfonates, which have good salinity tolerance and heat resistance properties. Though foamed cement slurry mixed with such a foam stabilizer can produce foams easily, it is difficult to stabilize the foams, i.e., the foam stability is poor. Consequently, it is unable to prepare foamed cement slurry at lower density; in addition, the prepared foamed hardened cement has shortcomings such as uneven pore structures, high permeability, and low compressive strength, etc. Moreover, sodium alkyl benzene sulfonate foam stabilizers have poor biological degradability, and may cause severe environmental pollution. In recent years, people set more attention to the biological effect, toxicological effect and safety of surfactants, and gave more and more favor to the research and application of environment-friendly foam stabilizers.

A technical research on chemical aeration method for preparing foamed cement slurry is reported recently, and chemical gas generating materials FCA and FCB, which have chemical reactions in cement slurry to produce nitrogen gas, are developed, and a foam stabilizer FCF is added, to prepare low-density foamed cement slurry. However, with that method, a hollow micro-sphere material is utilized first to decrease the density of cement slurry to a certain range, and then the chemical gas generating materials are utilized to produce nitrogen gas, so as to further decrease the density of cement slurry to 1.20 g/cm$^3$. Though the chemical aeration method for preparing low-density foamed cement slurry mentioned in the above literature can utilize chemical gas generating materials to prepare low-density foamed cement slurry, the density of the cement slurry can only be decreased to 1.20 g/cm$^3$ at the most; namely, it is unable to obtain foamed cement slurry at lower density; furthermore, the compressive strength of the foamed hardened cement is low, not enough to meet the requirement for well cementation of oil and gas wells.

SUMMARY OF THE INVENTION

To overcome the drawback of poor foam stability of existing foamed cement slurry, the present invention provides a foam stabilizer composition that can be used to obtain higher foam stability; in addition, to solve the problems of poor foam stability of existing cement slurry, difficulties in density decreasing, high permeability and low compressive strength of foamed hardened cement, etc., the present invention provides a foam stabilizer composition that can be used to attain high foam stability, further decreased density of foamed cement slurry, lower permeability and higher compressive strength of foamed hardened cement, foamed cement slurry and an additive composition thereof.

To attain the objects described above, the present invention provides a foam stabilizer composition, comprising C6-C20 alkyl amido alkyl amine oxide, C6-C20 alkyl amido alkyl betaine, and triterpenoid saponin compound.

The present invention further provides use of the above-mentioned foam stabilizer composition as a foam stabilizer in a foamed cement slurry.

The present invention further provides a foamed slurry additive composition, comprising: a gas generating material I, a gas generating material II, the above-mentioned foam stabilizer composition, and a nanometer strengthener, wherein, the gas generating material I is one or more of perchlorates and chlorites; the gas generating material II is one or more amine compounds; the nanometer strengthener is nanometer silicon dioxide and/or nanometer aluminum oxide.

The present invention further provides use of the above-mentioned foamed slurry additive composition as an additive in a foamed cement slurry.

The present invention further provides a foamed cement slurry comprising the above-mentioned foamed slurry additive composition.

The present invention further provides use of the above-mentioned foamed cement slurry in well cementation during oil and gas well drilling.

The foam stabilizer composition provided in the present invention is helpful for forming foamed cement slurry that has high foam stability, and the foam stabilizer composition can work with other active components in the foamed slurry additive composition provided in the present invention to enable the foamed cement slurry that contains the additive composition to obtain low density, high foam stability, low permeability, and high compressive strength, which is especially applicable to well cementing operation in an oil and natural gas exploration and development process.

Other features and advantages of the present invention will be further detailed in the embodiments hereunder.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The end points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values can be combined to obtain one or more new numeric ranges, which shall be deemed as having been disclosed specifically in this document.

The present invention provides a foam stabilizer composition, comprising C6-C20 alkyl amido alkyl amine oxide, C6-C20 alkyl amido alkyl betaine, and triterpenoid saponin compound.

According to the present invention, utilizing a synergistic effect among the active components C6-C20 alkyl amido alkyl amine oxide, C6-C20 alkyl amido alkyl betaine, and triterpenoid saponin compound contained in the foam stabilizer composition, the obtained foam stabilizer composition can effectively improve the foam stability of foamed cement slurry, and can be used to obtain foamed cement slurry that has other outstanding properties, when the foam stabilizer composition is used in foamed cement slurry, especially when the foam stabilizer composition is used together with the specific gas generating material I, gas generating material II, and nanometer strengthener described above in the present invention.

Wherein, the C6-C20 alkyl amido alkyl amine oxide may be an amine oxide compound represented by the following formula (1):

Formula (1):

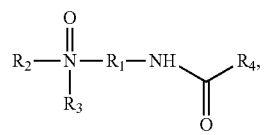

wherein $R_2$ and $R_3$ are selected independently from C1-C6 alkyl (e.g., methyl, ethyl, propyl, butyl, amyl, and hexyl), $R_1$ is alkylene (e.g., C1-C10 alkylene, such as —$CH_2$—, —$CH_2$—$CH_2$—, —$CH_2$—$CH_2$—$CH_2$—, —$CH(CH_3)$—$CH_2$—, —$CH_2$—$CH(CH_3)$—, —$CH_2$—$(CH_2)_2$—$CH_2$—, —$CH_2$—$(CH_2)_3$—$CH_2$—, —$CH_2$—$(CH_2)_4$—$CH_2$—, —$CH_2$—$(CH_2)_5$—$CH_2$—, —$CH_2$—$(CH_2)_6$—$CH_2$—, —$CH_2$—$(CH_2)_7$—$CH_2$— or —$CH_2$—$(CH_2)_8$—$CH_2$—), and $R_4$ and a connected amido bond with $R_4$ constitute C6-C20 alkyl amido bond in the C6-C20 alkyl amido alkyl amine oxide.

In consideration of improvement of overall properties of the foam stabilizer composition, convenience, and wide availability, preferably, the C6-C20 alkyl amido alkyl amine oxide is one or more of cocamidopropylamine oxide, lauramidopropylamine oxide, octylamidopropylamine oxide, nonylamidopropylamine oxide, decylamidopropylamine oxide, n-undecylamidopropylamine oxide, n-tetradecylamidopropylamine oxide, n-hexadecylamidopropylamine oxide, and n-octadecylamidopropylamine oxide, and more preferably is cocamidopropylamine oxide and/or lauramidopropylamine oxide, wherein, in the compounds enumerated above, methyl exists at the loci of $R_2$ and $R_3$. All of the above-mentioned C6-C20 alkyl amido alkyl amine oxides are commercially available, wherein, cocamidopropylamine oxide is a well-known mixture, and may also expressed as CAO.

According to the present invention, the C6-C20 alkyl amido alkyl betaine may be a betaine compound represented by the following formula (2):

Formula (2):

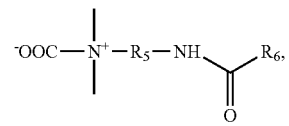

wherein $R_5$ is alkylene (e.g., C1-C10 alkylene, such as —$CH_2$—, —$CH_2$—$CH_2$—, —$CH_2$—$CH_2$—$CH_2$—, —CH ($CH_3$)—$CH_2$—, —$CH_2$—$CH(CH_3)$—, —$CH_2$—$(CH_2)_2$—$CH_2$—, —$CH_2$—$(CH_2)_3$—$CH_2$—, —$CH_2$—$(CH_2)_4$—$CH_2$—, —$CH_2$—$(CH_2)_5$—$CH_2$—, —$CH_2$—$(CH_2)_6$—$CH_2$—, —$CH_2$—$(CH_2)_7$—$CH_2$— or —$CH_2$—$(CH_2)_8$—$CH_2$—)), and $R_6$ and a connected amido bond with $R_6$ constitute C6-C20 alkylamido bond in the C6-C20 alkyl amido alkyl betaine.

In consideration of improvement of overall properties of the obtained foam stabilizer composition and wide availability, preferably, the C6-C20 alkyl amido alkyl betaine is one or more of cocamidopropyl betaine, lauramidopropyl betaine, octylamidopropyl betaine, nonylamidopropyl betaine, decylamidopropyl betaine, n-undecylamidopropyl betaine, n-tetradecylamidopropyl betaine, n-hexadecylamidopropyl betaine, and n-octadecylamidopropyl betaine, and more preferably is cocamidopropyl betaine and/or lauramidopropyl betaine. All of the above-mentioned C6-C20 alkyl amido alkyl betaines are commercially available, wherein, cocamidopropyl betaine is a well-known mixture, and may also expressed as CAB.

Wherein, the triterpenoid saponin compound may be any ordinary triterpenoid saponin compound in the art. However, in consideration of the compatibility between the triterpenoid saponin compound and other active components in the composition of the present invention, preferably the triterpenoid saponin compound is tea saponin and/or oleanolic acid, and more preferably is tea saponin. The triterpenoid saponin compound may be provided in a form of water solution, e.g., 20-50 wt. % water solution.

According to the present invention, though a good foam stabilizing effect can be obtained only if the foam stabilizer composition contains C6-C20 alkyl amido alkyl amine oxide, C6-C20 alkyl amido alkyl betaine, and triterpenoid saponin compound as the active components, to give a better play to the synergetic effect among the three components, preferably the weight ratio of the C6-C20 alkyl amido alkyl amine oxide:the C6-C20 alkyl amido alkyl betaine:the triterpenoid saponins (calculated in the active components respectively) is 100:80-150:150-300, more preferably is 100:100-130:170-250, and even more preferably is 100:108-120:180-205.

According to the present invention, the foam stabilizer composition may comprise C6-C20 alkyl amido alkyl amine oxide, C6-C20 alkyl amido alkyl betaine, and triterpenoid saponin compound (usually, the products available in the market may contain some other substances; of course, compositions that contain those substances are also in the scope of the present invention), or may contain other ordinary additives in the art. Furthermore, the foam stabilizer composition in the present invention may exist in a solid form, and thereby can be prepared into a water solution and used as a foam stabilizer when required (e.g., 20-40 wt. % water solution, preferably 25-35 wt. % water solution); accordingly, it can be deemed that the present invention further provides a foam stabilizer that contains the above-mentioned foam stabilizer composition and water. Of course, it can be appreciated that the composition disclosed in the present invention may contain water. Both of the cases are in the scope of the present invention.

The present invention further provides use of the above-mentioned foam stabilizer composition as a foam stabilizer in foamed cement slurry.

The present invention further provides a foamed slurry additive composition, comprising: a gas generating material I, a gas generating material II, the above-mentioned foam stabilizer composition, and a nanometer strengthener, wherein, the gas generating material I is one or more of perchlorates and chlorites;

the gas generating material II is one or more amine-containing compounds;

the nanometer strengthener is nanometer silicon dioxide and/or nanometer aluminum oxide.

According to the present invention, as described above, in the foamed slurry additive composition provided in the present invention, utilizing the above-mentioned foam stabilizer composition as a foam stabilizer and assisted by a nanometer strengthener, the gas release system that contains the gas generating material I and the gas generating material II can form foamed cement slurry that has low density, high foam stability, low permeability, and high compressive strength, wherein the density is adjustable, for example, up to 1.5 $g/cm^3$, or down to 0.8 $g/cm^3$, or even down to 0.5 $g/cm^3$. To give a better play to the synergistic effect among the active components in the foamed slurry additive composition so as to obtain foamed cement slurry with better properties, preferably the weight ratio of the gas generating material I:the gas generating material II:the foam stabilizer composition:the nanometer strengthener (calculated in the active constituent respectively) is 100:20-80:90-500:95-600, more preferably is 100:40-72:150-300:200-500, even more preferably is 100:44-60:190-250:250-300, such as 100:40-72:90-135:95-200.

Wherein, the above-mentioned foam stabilizer composition can be provided in a water solution form; similar to the case of the foam stabilizer described above, the concentration of the solution may be 20-40 wt. %, and preferably is 25-35 wt. %.

Wherein, the gas generating material I has an oxidizing property, and preferably is one or more of sodium chlorite, sodium perchlorate, potassium perchlorate, potassium chlorite, magnesium chlorite, lithium perchlorate, calcium chlorite, ammonium perchlorate, barium perchlorate, and zinc chlorite, more preferably is one or more of sodium chlorite, sodium perchlorate, potassium perchlorate, and potassium chlorite.

Wherein, the gas generating material II has a reducing property, and can react with the gas generating material I to produce nitrogen gas, so as to provide foams to the foamed cement slurry. Preferably, the gas generating material II is one or more of hydrazine compounds, hydroxylamine compounds, and amide compounds, more preferably is one or more of N,N'-dimethyl hydrazide, semicarbazide, carbohydrazide, hydroxylamine hydrochloride, formyl hydrazide, oxalyl dihydrazide, N,N'-diacetyl hydrazide, formamide, and hydroxylamine sulphate, and even more preferably is carbohydrazide and/or hydroxylamine sulphate. The gas generating material II may be provided in a water solution form, such as 35-65 wt. % water solution.

Wherein, the particle size of the nanometer strengthener preferably is 7-20 nm. Usually, the nanometer strengthener is provided in a liquid form, such as colloidal nanometer silicon dioxide, or colloidal nanometer aluminum oxide.

The present invention further provides use of the above-mentioned foamed slurry additive composition as an additive in foamed cement slurry.

The present invention further provides foamed cement slurry comprising the above-mentioned foamed slurry additive composition.

According to the present invention, as described above, the foamed cement slurry comprising the above-mentioned foamed slurry additive composition in the present invention has high foam stability, low permeability, and high compressive strength, and the density may be adjusted to a lower value. Preferably, in relation to 100 part by weight cement in the foamed cement slurry, the content of the foamed slurry additive composition is 2-15 part by weight, more preferably is 2.32-11.15 part by weight, even more preferably is 3.1-10 part by weight, and still more preferably is 3.3-5.7 part by weight.

Wherein, the cement in the foamed cement slurry may be any ordinary cement in the art for forming foamed cement slurry to be used in well cementation during oil and gas well drilling. For example, the cement may be one or more of API grade G cement, grade H cement, and grade A cement for oil wells.

Moreover, the foamed cement slurry may further contain other ordinary additives for foamed cement slurry in the art; preferably, the foamed cement slurry further contains a fluid-loss control agent, a dispersant, and a retarder. To obtain foamed cement slurry with better properties, preferably, in relation to 100 part by weight cement in the foamed cement slurry, the content of the fluid-loss control agent is 1.1-3.25 part by weight (preferably is 1.5-2 part by weight), the content of the dispersant is 0.1-0.5 part by weight (preferably is 0.3-0.4 part by weight), and the content of the retarder is 0.3-1 part by weight (preferably is 0.4-0.8 part by weight), calculated in dry weight respectively.

On the premise of meeting the dose ranges described above, in a preferred embodiment of the present invention, the foamed cement slurry contains (excluding the solvent): 100 part by weight cement, 0.4-2.65 part by weight gas generating material I (preferably 0.48-1 part by weight), 0.1-2.2 part by weight gas generating material II (preferably 0.2-0.5 part by weight), 0.82-2.3 part by weight foam stabilizer composition (preferably 1.2-2 part by weight), 1-4 part by weight nanometer strengthener (preferably 1.5-3 part by weight), 1.1-3.25 part by weight fluid-loss control agent (preferably 1.5-2 part by weight), 0.1-0.5 part by weight dispersant (preferably 0.3-0.4 part by weight), and 0.3-1 part by weight retarder (preferably 0.4-0.8 part by weight).

Wherein, the fluid-loss control agent has an effect of reducing fluid loss in the foamed cement slurry, and may be any ordinary fluid-loss control agent for foamed cement slurry in the art. For instance, the fluid-loss control agent may be one or more of polyvinyl alcohol, butadiene-styrene latex, vinyl acetate-ethylene latex, and poly(acrylamide/2-acrylamido-2-methyl propanesulfonic acid) (AM/AMPS, i.e., a copolymer of acrylamide and 2-acrylamido-2-methyl propanesulfonic acid) polymer fluid-loss control agent and the like.

Wherein, the dispersant has an effect of improving the fluidity of the foamed cement slurry, and can be any ordinary dispersant for foamed cement slurry in the art. For instance, the dispersant may be one or more of sulfonated acetone-formaldehyde polymer dispersant and poly-naphthalene sulfonate dispersant and the like.

Wherein, the retarder has an effect of regulating the thickening time of the foamed cement slurry, and can be any retarder for foamed cement slurry in the art. For instance, the retarder may be one or more of sulfonated lignins (sodium lignosulfonate, etc.), sodium gluconate, poly(2-acrylamido-2-methyl propanesulfonic acid/acrylic acid) (AMP S/AA, i.e., a copolymer of 2-acrylamido-2-methyl propanesulfonic acid and acrylic acid), and poly(2-acrylamido-2-methyl propanesulfonic acid/itaconic acid) (AMP S/itaconic acid, i.e., a copolymer of 2-acrylamido-2-methyl propanesulfonic acid and itaconic acid), etc.

According to the present invention, usually the foamed cement slurry further contains water; therefore, preferably the foamed cement slurry in the present invention further contains an aqueous solvent, wherein in relation to 100 part by weight cement in the foamed cement slurry, the content of the aqueous solvent may be 42-72 part by weight, preferably is 45-65 part by weight, more preferably is 48-60 part by weight, such as 55-60 part by weight. The aqueous solvent may be water, or a water solution that contains other solutes (e.g., one or more of sodium chloride, potassium chloride, magnesium chloride, and calcium chloride, etc.) in trace amount, which have no influence on the properties of the foamed cement slurry in the present invention.

The present invention further provides use of the above-mentioned foamed cement slurry in well cementation during oil and gas well drilling.

The foamed cement slurry that contains the additive composition provided in the present invention forms foamed cement slurry that is characterized by a low density (down to 1 $g/cm^3$ or lower, even as low as 0.8 $g/cm^3$), high foam stability, low permeability, and high compressive strength. The foamed cement slurry is environment-friendly, has a good foam producing and stabilizing effect, can produce high-quality foamed cement slurry and meet the requirement for compressive strength in well cementation for cementing a productive reservoir.

Hereunder the present invention will be detailed in embodiments.

In the following embodiments and comparative examples:

The grade G oil well cement is highly sulfur-resistant grade G oil well cement from Sichuan Jiahua Special Cement Co., Ltd.

The cocamidopropylamine oxide is cocamidopropylamine oxide CAO-35 from Shanghai Asia Chemicals Co., Ltd. The cocamidopropyl betaine is cocamidopropyl betaine CAB-35 from Shanghai Asia Chemicals Co., Ltd. The lauramidopropylamine oxide is lauramidopropylamine oxide LAO-30 from Shanghai Asia Chemicals Co., Ltd. The lauramidopropyl betaine is lauramidopropyl betaine LAB-35 from Shanghai Asia Chemicals Co., Ltd.

The tea saponin is tea saponin liquid (water solution) from Zhejiang Changshan Jincheng Oil and Grease Plant, in which the content of active triterpenoid saponin is 38 wt. %.

Foam Stabilizer Examples 1-6

These examples are provided here to describe the foam stabilizer composition.

According to the formulations shown in Table 1, the listed amine oxide compounds, betaine compounds, tea saponins, and water in appropriate amount are mixed to produce water solutions at corresponding concentrations; thus, foam stabilizers F1-F6 are obtained respectively.

Foam Stabilizer Comparative Examples 1-3

According to the formulations shown in Table 1, the listed amine oxide compounds, betaine compounds, tea saponins, and water in appropriate amount are mixed to produce water solutions at corresponding concentrations; thus, foam stabilizers DF1-DF3 are obtained respectively.

TABLE 1

| Foam Stabilizer | Amine Oxide/ part by weight | Betaine/ part by weight | Tea Saponin Liquid/part by weight | Solution Concentration/ wt. % |
|---|---|---|---|---|
| F1 | Coconut oil/00 | Coconut oil/112 | Tea saponin/200 | 35 |
| F2 | Coconut oil/100 | Coconut oil/120 | Tea saponin/186 | 30 |
| F3 | Coconut oil/100 | Coconut oil/108 | Tea saponin/205 | 26 |
| F4 | Laurel/100 | Laurel/117 | Tea saponin/179 | 32 |
| F5 | Coconut oil/100 | Coconut oil/90 | Tea saponin/150 | 35 |
| F6 | Coconut oil/100 | Coconut oil/150 | Tea saponin/270 | 35 |
| DF1 | Coconut oil/100 | — | Tea saponin/200 | 35 |
| DF2 | Coconut oil/100 | Coconut oil/112 | — | 35 |
| DF3 | — | Coconut oil/100 | Tea saponin/178 | 35 |

Note:
The "coconut oil" in the amine oxide column represents cocamidopropylamine oxide; the "laurel" in the amine oxide column represents lauramidopropylamine oxide; the "coconut oil" in the betaine column represents cocamidopropyl betaine; the "laurel" in the betaine column represents lauramidopropyl betaine; "—" represents the substance is not used.

Foamed Cement Slurry Example 1

This example is provided here to describe the foamed slurry additive composition and the foamed cement slurry provided in the present invention.

(1) Grade G oil well cement, sodium perchlorate gas generating material I, polyvinyl alcohol fluid-loss control agent (fluid-loss control agent G60S from Tianjin Zhongyou Boxing Engineering Technology Co., Ltd.), and sulfonated formaldehyde-acetone polymer dispersant (dispersant CF40 from Tianjin Zhongyou Boxing Engineering Technology Co., Ltd.) are mixed in dry state; thus, a homogenous mixture is obtained;

(2) Water, foam stabilizer F1, nanometer silica sol nanometer strengthener (the solid content is 35 wt. %, the particle size of nanometer silicon dioxide is 8-15 nm), and sodium lignosulfonate retarder (the solid content is 16 wt. %, from Shandong Gaotang East China Lignins Co., Ltd.) are mixed while stirring at 4,000 rpm for 15 s; then, the mixture obtained by dry mixing as described above is added, and carbohydrazide gas generating material II (provided in a form of 46 wt. % water solution) is added under an enclosed condition; next, the mixture is stirred for 35 s at 12,000 rpm; thus, foamed cement slurry S1 is obtained, and the density of it is 0.77 g/cm$^3$, wherein excluding the solvent, the weight ratio of cement:gas generating material I:gas generating material II:foam stabilizer:nanometer strengthener:fluid-loss control agent:dispersant:retarder:water (the water is calculated as the water added separately in the step (2), the same below) is 100:0.92:0.44:1.8:2.5:1.6:0.35:0.4:60.

Foamed Cement Slurry Example 2

This example is provided here to describe the foamed slurry additive composition and the foamed cement slurry provided in the present invention.

The method described in the example 1 of foamed cement slurry is used, with the following differences: sodium perchlorate is replaced with sodium chlorite for the gas generating material I, carbohydrazide is replaced with hydroxylamine sulphate for the gas generating material II, foam stabilizer F1 is replaced with foam stabilizer F2 for the foam stabilizer; thus, foamed cement slurry S2 is obtained, and the density of it is 0.92 g/cm$^3$, wherein excluding the solvent, the weight ratio of cement:gas generating material I:gas generating material II:foam stabilizer:nanometer strengthener:fluid-loss control agent:dispersant:retarder:water is 100:0.85:0.4:1.7:2.3:1.55:0.3:0.47:56.

Foamed Cement Slurry Example 3

This example is provided here to describe the foamed slurry additive composition and the foamed cement slurry provided in the present invention.

The method described in the example 1 of foamed cement slurry is used, with the following differences: sodium perchlorate is replaced with potassium perchlorate for the gas generating material I, carbohydrazide is replaced with hydroxylamine sulphate for the gas generating material II, foam stabilizer F1 is replaced with foam stabilizer F3 for the foam stabilizer, and sodium lignosulfonate is replaced with sodium gluconate for the retarder; thus, foamed cement slurry S3 is obtained, and the density of it is 1.15 g/cm$^3$, wherein excluding the solvent, the weight ratio of cement: gas generating material I:gas generating material II:foam stabilizer:nanometer strengthener:fluid-loss control agent:dispersant:retarder:water is 100:0.75:0.36:1.5:2:1.5:0.3: 0.55:52.

Foamed Cement Slurry Example 4

This example is provided here to describe the foamed slurry additive composition and the foamed cement slurry provided in the present invention.

The method described in the example 1 of foamed cement slurry is used, with the following differences: excluding the solvent, the weight ratio of cement:gas generating material I:gas generating material II:foam stabilizer:nanometer strengthener:fluid-loss control agent:dispersant:retarder:water is 100:0.61:0.3:1.45:1.7:1.5:0.32:0.62:50; thus, foamed cement slurry S4 is obtained, and the density of it is 1.28 g/cm$^3$.

Foamed Cement Slurry Example 5

This example is provided here to describe the foamed slurry additive composition and the foamed cement slurry provided in the present invention.

The method described in the example 1 of foamed cement slurry is used, with the following differences: excluding the solvent, the weight ratio of cement:gas generating material I:gas generating material II:foam stabilizer:nanometer strengthener:fluid-loss control agent:dispersant:retarder:water is 100:0.5:0.22:1:1.5:1.5:0.36:0.8:48; thus, foamed cement slurry S5 is obtained, and the density of it is 1.4 g/cm$^3$.

Foamed Cement Slurry Example 6

This example is provided here to describe the foamed slurry additive composition and the foamed cement slurry provided in the present invention.

The method described in the example 1 of foamed cement slurry is used, with the following differences: foam stabilizer F1 is replaced with foam stabilizer F4; thus, foamed cement slurry S6 is obtained, and the density of it is 0.83 g/cm$^3$.

Foamed Cement Slurry Example 7

This example is provided here to describe the foamed slurry additive composition and the foamed cement slurry provided in the present invention.

The method described in the example 1 of foamed cement slurry is used, with the following differences: foam stabilizer F1 is replaced with foam stabilizer F5; thus, foamed cement slurry S7 is obtained, and the density of it is 0.87 g/cm³.

Foamed Cement Slurry Example 8

This example is provided here to describe the foamed slurry additive composition and the foamed cement slurry provided in the present invention.

The method described in the example 1 of foamed cement slurry is used, with the following differences: foam stabilizer F1 is replaced with foam stabilizer F6; thus, foamed cement slurry S8 is obtained, and the density of it is 0.90 g/cm³.

Foamed Cement Slurry Comparative Example 1

The method described in the example 1 of foamed cement slurry is used, with the following differences: foam stabilizer F1 is replaced with foam stabilizer DF1; thus, foamed cement slurry DS1 is obtained, and the density of it is 0.92 g/cm³ (the density of the foamed cement slurry is higher because the foam stabilizing effect of the foam stabilizer DF1 is inferior to that of the foam stabilizer F1 used in the example 1).

Foamed Cement Slurry Comparative Example 2

The method described in the example 1 of foamed cement slurry is used, with the following differences: foam stabilizer F1 is replaced with foam stabilizer DF2; thus, foamed cement slurry DS2 is obtained, and the density of it is 0.97 g/cm³ (the density of the foamed cement slurry is higher because the foam stabilizing effect of the foam stabilizer DF2 is inferior to that of the foam stabilizer F1 used in the example 1).

Foamed Cement Slurry Comparative Example 3

The method described in the example 1 of foamed cement slurry is used, with the following differences: sodium perchlorate is replaced with ammonium persulfate for the gas generating material I, and N,N'-dimethyl hydrazide is replaced with azobisformamide for the gas generating material II; thus, foamed cement slurry DS3 is obtained, and the density of it is 1.18 g/cm³ (the density is higher because the foaming effect is inferior).

Test Example 1

The foamed cement slurry S1-S8 and DS1-DS3 are tested as per American petroleum institute standard/API 10B-4-2004 to measure the fluid loss under normal pressure and temperature (API) and thickening time. The results are shown in Table 2.

TABLE 2

| Foamed Cement Slurry | API Fluid Loss mL/30 min | Thickening Time/min. | | |
|---|---|---|---|---|
| | | 40° C./ 15 MPa | 60° C./ 30 MPa | 90° C./ 40 MPa |
| S1 | 43 | 274 | 205 | 188 |
| S2 | 40 | 290 | 220 | 188 |
| S3 | 40 | 302 | 231 | 195 |
| S4 | 38 | 270 | 210 | 180 |
| S5 | 46 | 282 | 217 | 185 |
| S6 | 45 | 275 | 212 | 180 |
| S7 | 48 | 292 | 234 | 193 |
| S8 | 48 | 301 | 256 | 210 |

TABLE 2-continued

| Foamed Cement Slurry | API Fluid Loss mL/30 min | Thickening Time/min. | | |
|---|---|---|---|---|
| | | 40° C./ 15 MPa | 60° C./ 30 MPa | 90° C./ 40 MPa |
| DS1 | 53 | 285 | 210 | 186 |
| DS2 | 55 | 271 | 206 | 183 |
| DS3 | 62 | 329 | 276 | 235 |

It can be seen from the results shown in Table 2: in each of the examples of foamed cement slurry in the present invention, the fluid loss of foamed cement slurry is effectively controlled and is lower, and the cement slurry thickening time is maintained within a reasonable range of 180-302 min., meeting the requirements of cementing operation. It indicates there is good compatibility among the gas generating material, foam stabilizer, nanometer strengthener, fluid-loss control agent, dispersant, and retarder. In contrast, the fluid loss of the slurry is higher in the comparative examples 1 and 2 of foamed cement slurry, indicating that the compatibility between the foam stabilizer and the fluid-loss control agent is poor and has a slight detrimental effect to the fluid loss of the cement slurry in the comparative examples 1 and 2. The fluid loss of slurry is obviously higher and the thickening time is obviously longer in the comparative example 3 of foamed cement slurry, indicating that the compatibility among the gas generating material, fluid-loss control agent, and retarder is very poor and has a severe detrimental effect to the fluid loss and thickening time of the cement slurry in the comparative example 3.

Test Example 2

Foamed hardened cement materials formed from the foamed cement slurry S1-S8 and DS1-DS3 are tested as per API 10B-4-2004 to measure the compressive strength and permeability. The results are shown in Table 3.

TABLE 3

| Foamed Cement Slurry | Compressive strength/MPa (40° C. × 15 MPa × 48 h) | Compressive strength/MPa (60° C. × 30 MPa × 48 h) | Permeability/ $10^{-3}$ μm² |
|---|---|---|---|
| S1 | 9.25 | 14.9 | 0.307 |
| S2 | 9.82 | 15.28 | 0.264 |
| S3 | 10.37 | 15.95 | 0.21 |
| S4 | 12.86 | 16.2 | 0.192 |
| S5 | 14.70 | 18.37 | 0.138 |
| S6 | 9 | 14.67 | 0.315 |
| S7 | 8.8 | 14.36 | 0.330 |
| S8 | 8.94 | 14.4 | 0.325 |
| DS1 | 8.56 | 13.5 | 0.402 |
| DS2 | 8.47 | 13.29 | 0.407 |
| DS3 | 8.6 | 13.53 | 0.41 |

It can be seen from the results shown in Table 3: under similar low density conditions, compared with the comparative examples, the foamed cement slurry products prepared in the examples of the present invention have advantages of higher compressive strength and lower permeability, and are more suitable for use in well cementation for oil and gas wells.

Test Example 3

The foamed cement slurry S1-S8 and DS1-DS3 are kept still at room temperature (25° C.), and the density of foamed cement slurry is measured once every 10 minutes. The density values and density change rates are shown in Table 4.

TABLE 4

| Foamed Cement Slurry | Densities at Different Temperatures /g/cm³ | | | | | | | Density Change Rate |
|---|---|---|---|---|---|---|---|---|
| | 0 min | 10 min | 20 min | 30 min | 40 min | 50 min | 60 min | |
| S1 | 0.77 | 0.774 | 0.780 | 0.789 | 0.897 | 0.804 | 0.815 | +5.84% |
| S2 | 0.92 | 0.923 | 0.930 | 0.940 | 0.951 | 0.960 | 0.968 | +5.22% |
| S3 | 1.15 | 1.152 | 1.160 | 1.173 | 1.186 | 1.197 | 1.211 | +5.3% |
| S4 | 1.28 | 1.283 | 1.291 | 1.303 | 1.320 | 1.331 | 1.344 | +5.0% |
| S5 | 1.40 | 1.403 | 1.408 | 1.417 | 1.435 | 1.447 | 1.458 | +4.14% |
| S6 | 0.83 | 0.835 | 0.842 | 0.855 | 0.873 | 0.880 | 0.896 | +7.95% |
| S7 | 0.87 | 0.874 | 0.882 | 0.897 | 0.913 | 0.927 | 0.941 | +8.16% |
| S8 | 0.90 | 0.903 | 0.910 | 0.926 | 0.941 | 0.952 | 0.973 | +8.11% |
| DS1 | 0.92 | 0.931 | 0.946 | 0.968 | 0.990 | 1.018 | 1.040 | +13.04% |
| DS2 | 0.97 | 0.982 | 1.006 | 1.029 | 1.053 | 1.074 | 1.092 | +12.58% |
| DS3 | 1.18 | 1.189 | 1.205 | 1.226 | 1.250 | 1.278 | 1.30 | +10.17% |

Note:
Density change rate = (density$_{60min.}$ − density$_{0min.}$)/density$_{0min.}$ × 100%

It can be seen from the above stability test results: the treating agents of the present invention, including gas generating material, foam stabilizer, and nanometer strengthener, have a good synergetic effect among them; hence, the foamed cement slurry exhibits outstanding stability, and has a low density change rate in still state.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A foam stabilizer composition, consisting of a C6-C20 alkyl amido alkyl amine oxide, a C6-C20 alkyl amido alkyl betaine, and a triterpenoid saponin compound, and optionally water.

2. The foam stabilizer composition according to claim 1, wherein a weight ratio of the C6-C20 alkyl amido alkyl amine oxide:the C6-C20 alkyl amido alkyl betaine:the triterpenoid saponin compound is 100:80-150:150-300.

3. The foam stabilizer composition according to claim 2, wherein the weight ratio of the C6-C20 alkyl amido alkyl amine oxide:the C6-C20 alkyl amido alkyl betaine:the triterpenoid saponin compound is 100:100-130:170-250.

4. The foam stabilizer composition according to claim 1, wherein the C6-C20 alkyl amido alkyl amine oxide is one or more of cocamidopropylamine oxide, lauramidopropylamine oxide, octylamidopropylamine oxide, nonylamidopropylamine oxide, decylamidopropylamine oxide, n-undecylamidopropylamine oxide, n-tetradecylamidopropylamine oxide, n-hexadecylamidopropylamine oxide, and n-octadecylamidopropylamine oxide;

the C6-C20 alkyl amido alkyl betaine is one or more of cocamidopropyl betaine, lauramidopropyl betaine, octylamidopropyl betaine, nonylamidopropyl betaine, decylamidopropyl betaine, n-undecylamidopropyl betaine, n-tetradecylamidopropyl betaine, n-hexadecylamidopropyl betaine, and n-octadecylamidopropyl betaine;

the triterpenoid saponin compound is tea saponin and/or oleanolic acid.

5. The foam stabilizer composition according to claim 4, wherein the C6-C20 alkyl amido alkyl amine oxide is cocamidopropylamine oxide and/or lauramidopropylamine oxide;

the C6-C20 alkyl amido alkyl betaine is cocamidopropyl betaine and/or lauramidopropyl betaine; and the triterpenoid saponin compound is tea saponin.

6. A foamed slurry additive composition, comprising: a gas generating material I, a gas generating material II, the foam stabilizer composition according to claim 1, and a nano-strengthener, wherein, the gas generating material I is one or more of perchlorates and chlorites;

the gas generating material II is one or more amine compound;

the nano-strengthener is nano-silicon dioxide, nano-aluminum oxide, or a combination thereof.

7. The additive composition according to claim 6, wherein a weight ratio of the gas generating material I:the gas generating material II:the foam stabilizer composition:the nano-strengthener is 100:20-80:90-500:95-600.

8. The additive composition according to claim 7, wherein the weight ratio of the gas generating material I:the gas generating material II:the foam stabilizer composition:the nano-strengthener is 100:40-72:150-300:200-500.

9. The additive composition according to claim 7, wherein the gas generating material I is one or more of sodium chlorite, sodium perchlorate, potassium perchlorate, potassium chlorite, magnesium chlorite, lithium perchlorate, calcium chloride, ammonium perchlorate, barium perchlorate, and zinc chloride;

the gas generating material II is one or more of a hydrazine compound, a hydroxylamine compound, and an amide compound;

the particle size of the nano-strengthener is 7-20 nm.

10. The additive composition according to claim 9, wherein the gas generating material I is one or more of sodium chlorite, sodium perchlorate, potassium perchlorate, and potassium chlorite; the gas generating material II is one or more of N,N'-dimethyl hydrazide, semicarbazide, carbohydrazide, hydroxylamine hydrochloride, formyl hydrazide, oxalyl dihydrazide, N,N'-diacetyl hydrazide, formamide, and hydroxylamine sulphate.

11. The additive composition according to claim 6, wherein in the foam stabilizer composition, a weight ratio of the C6-C20 alkyl amido alkyl amine oxide:the C6-C20 alkyl amido alkyl betaine:the triterpenoid saponin compound is 100:80-150:150-300.

12. The additive composition according to claim 11, wherein in the foam stabilizer composition, the weight ratio of the C6-C20 alkyl amido alkyl amine oxide:the C6-C20 alkyl amido alkyl betaine:the triterpenoid saponin compound is 100:100-130:170-250.

13. The additive composition according to claim 11, wherein the C6-C20 alkyl amido alkyl amine oxide is one or more of cocamidopropylamine oxide, lauramidopropylamine oxide, octylamidopropylamine oxide, nonylamidopropylamine oxide, decylamidopropylamine oxide, n-undecylamidopropylamine oxide, n-tetradecylamidopropylamine oxide, n-hexadecylamidopropylamine oxide, and n-octadecylamidopropylamine oxide;

the C6-C20 alkyl amido alkyl betaine is one or more of cocamidopropyl betaine, lauramidopropyl betaine, octylamidopropyl betaine, nonylamidopropyl betaine, decylamidopropyl betaine, n-undecylamidopropyl betaine, n-tetradecylamidopropyl betaine, n-hexadecylamidopropyl betaine, and n-octadecylamidopropyl betaine; and the triterpenoid saponin compound is tea saponin and/or oleanolic acid.

14. Foamed cement slurry, comprising the foamed slurry additive composition according to claim 6.

15. The foamed cement slurry according to claim 14, wherein in relation to 100 parts by weight of cement in the foamed cement slurry, the content of the foamed slurry additive composition is 2-15 parts by weight.

16. The foamed cement slurry according to claim 15, wherein in relation to 100 parts by weight of cement in the foamed cement slurry, the content of the foamed slurry additive composition is 2.32-11.15 parts by weight.

17. The foamed cement slurry according to claim 14, further comprising a fluid-loss control agent, a dispersant, and a retarder, and in relation to 100 parts by weight of cement in the foamed cement slurry, the content of the fluid-loss control agent is 1.1-3.25 parts by weight, the content of the dispersant is 0.1-0.5 parts by weight, and the content of the retarder is 0.3-1 parts by weight.

18. The foamed cement slurry according to claim 14, further comprising an aqueous solution, and in relation to 100 parts by weight of cement in the foamed cement slurry, the content of the aqueous solution is 42-72 parts by weight.

19. The foamed cement slurry according to claim 18, wherein in relation to 100 parts by weight of cement in the foamed cement slurry, the content of the aqueous solution is 45-65 parts by weight.

20. The foamed cement slurry according to claim 19, wherein in relation to 100 parts by weight of cement in the foamed cement slurry, the content of the aqueous solution is 48-60 parts by weight.

\* \* \* \* \*